United States Patent [19]
Bowen et al.

[11] 4,167,303
[45] Sep. 11, 1979

[54] LIGHT TRANSMITTING FIBER CABLE CONNECTOR

[75] Inventors: Terry P. Bowen, Etters; Charles D. Hoover, Harrisburg; Gilbert D. Ferdon, Hummelstown; Robert G. Harwood, Mechanicsburg, all of Pa.

[73] Assignee: AMP Incorporated, Harrisburg, Pa.

[21] Appl. No.: 819,919

[22] Filed: Jul. 28, 1977

[51] Int. Cl.² .............................................. G02B 5/14
[52] U.S. Cl. ................................................ 350/96.21
[58] Field of Search ................ 350/96.20, 96.21, 96.22

[56] References Cited

U.S. PATENT DOCUMENTS

| | | | |
|---|---|---|---|
| 3,904,269 | 9/1975 | Lebduska et al. | 350/96.22 |
| 3,922,064 | 11/1975 | Clark et al. | 350/96.22 |
| 3,982,815 | 9/1976 | Nakayama | 350/96.22 |
| 3,990,779 | 11/1976 | McCartney | 350/96.22 |
| 3,999,837 | 12/1976 | Bowen et al. | 350/96.22 |

OTHER PUBLICATIONS

"Connector Mount for Fiber Optic Bundle", by Millet, IBM Tech. Disc. Bulletin, vol. 14, No. 3, Aug. 1971.

*Primary Examiner*—John K. Corbin
*Assistant Examiner*—Stewart Levy
*Attorney, Agent, or Firm*—Egan, Russel J.; Gerald K. Kita

[57] ABSTRACT

An improved connector is disclosed for interconnecting a plurality of fiber optic cables with a like plurality of fiber optic cables or optical devices, the fibers of the cables being accurately positioned within the respective connectors. The subject connector can be used for either splicing or terminating individual cables, each cable including at least one fiber, as well as connecting a plurality of light transmitting fiber bundles in a single connector assembly to transmitting and receiving devices. The subject connector includes a housing with at least one cable receiving bore therein; an assembly including an annular crimping ring, a profiled ferrule member, and a helical spring member secured to an end of each cable; and a cap member securing the ferrule members in the housing member in a spring loaded condition.

The bores for receiving the fibers are accurately formed in the ferrule members by placing the ferrule member, which initially has a blind bore therein, into a bushing which annularly compresses the ferrule member and then completing the blind bore by drilling from one face or the other with conventional or laser drilling means. Greater concentricity can be achieved by rotating the ferrule member and bushing about their common axis during the drilling operation. Upon release from the bushing, the bore will expand to be larger than necessary and will allow the free passage therethrough of the optical fibers. The fibers will subsequently be compressed within the ferrule to be rigidly and accurately positioned therein.

9 Claims, 14 Drawing Figures

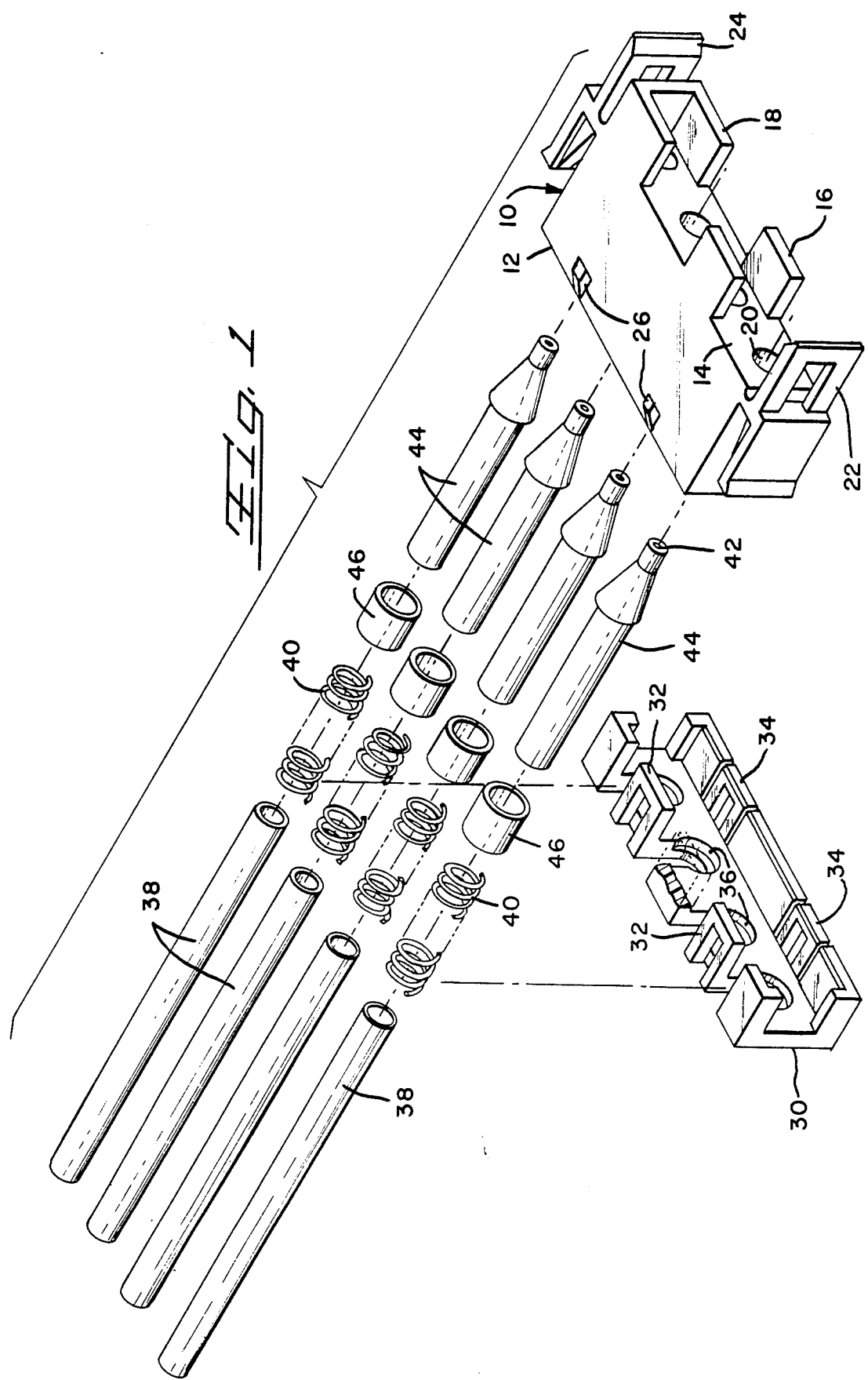

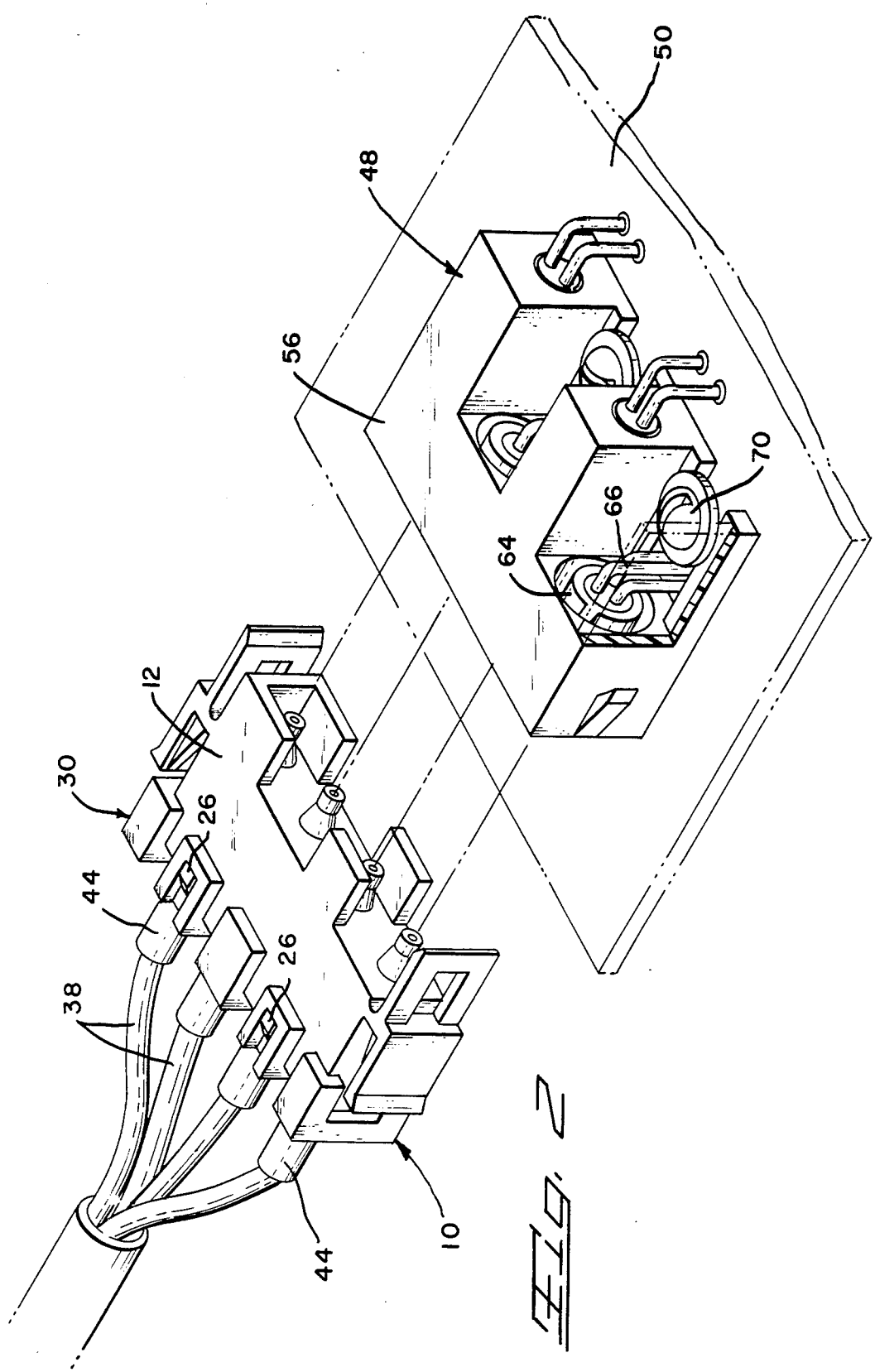

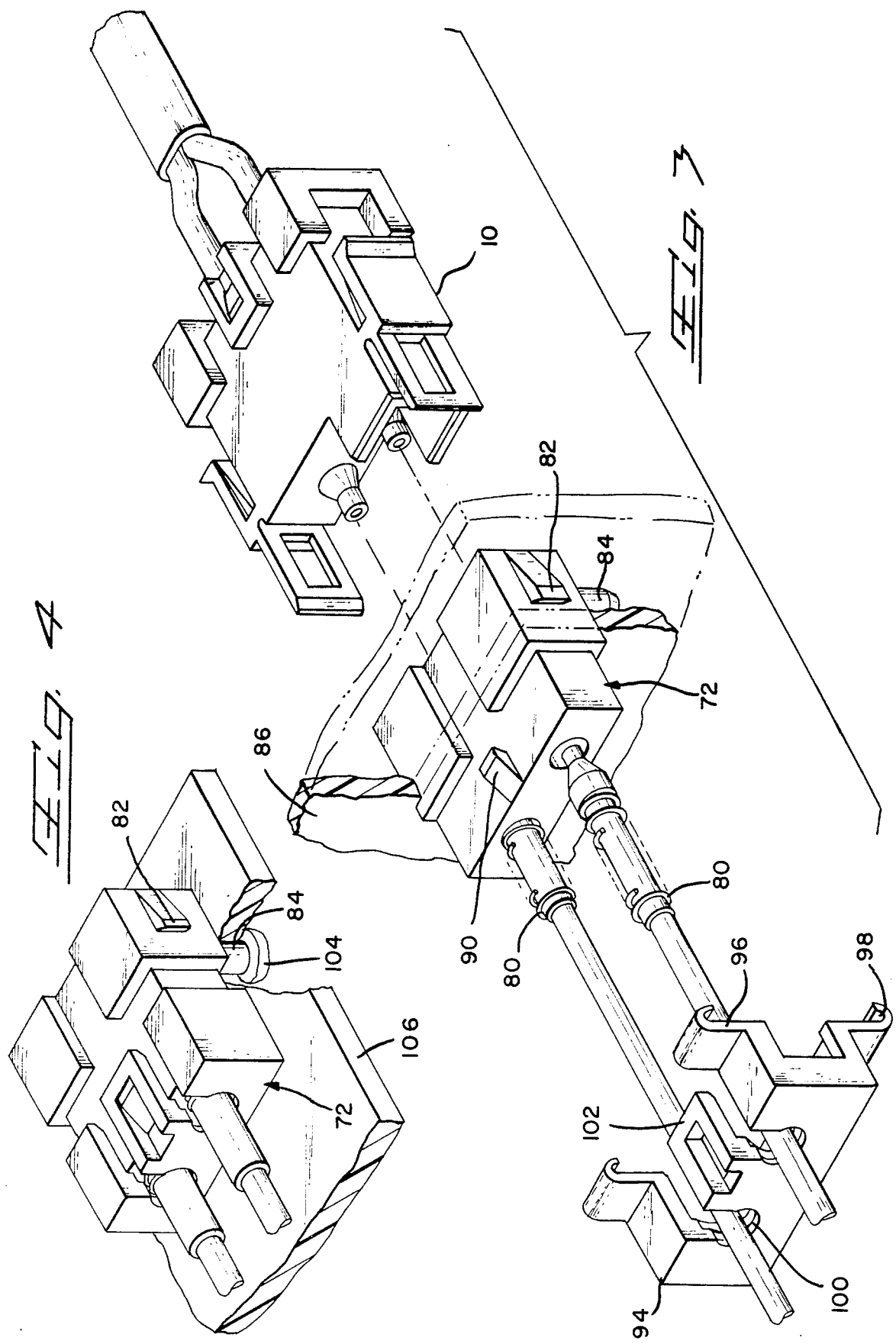

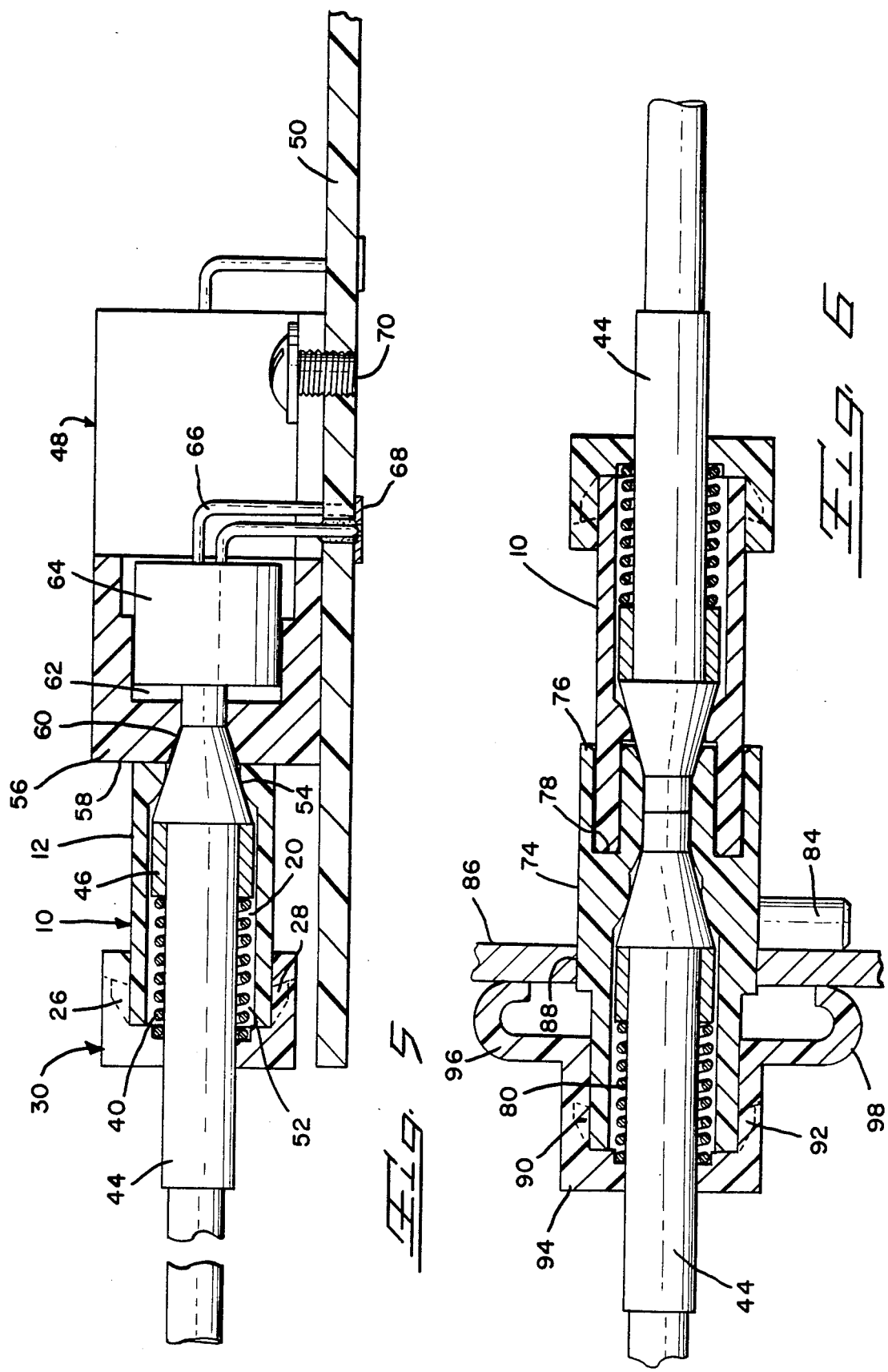

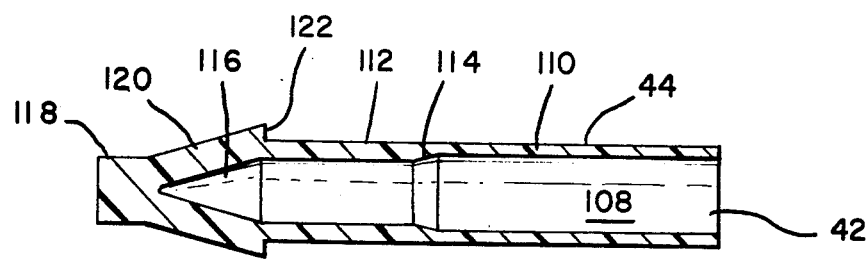
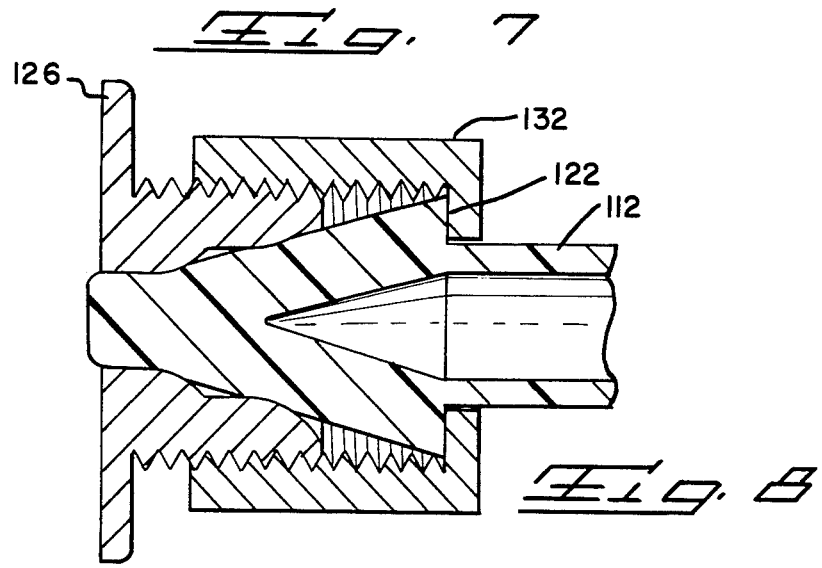
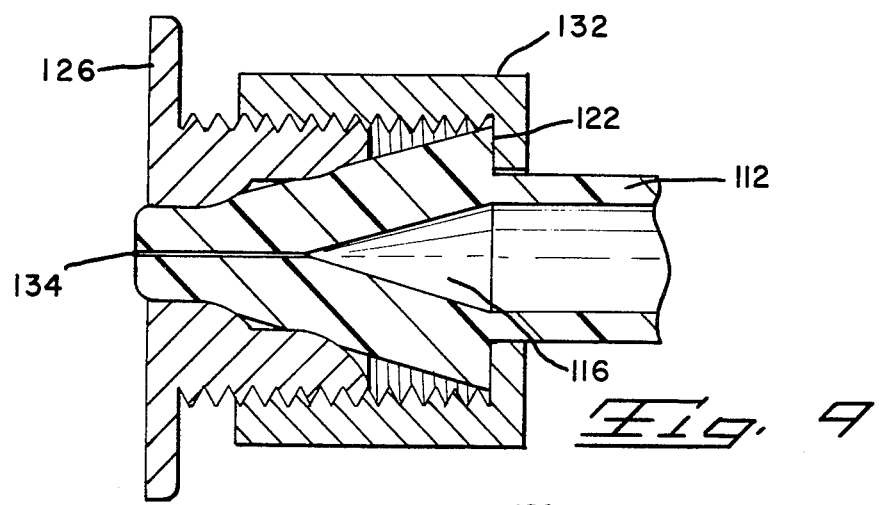
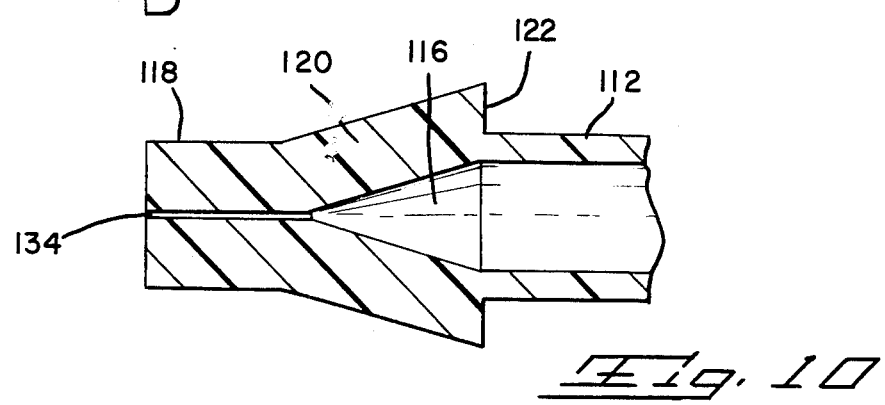

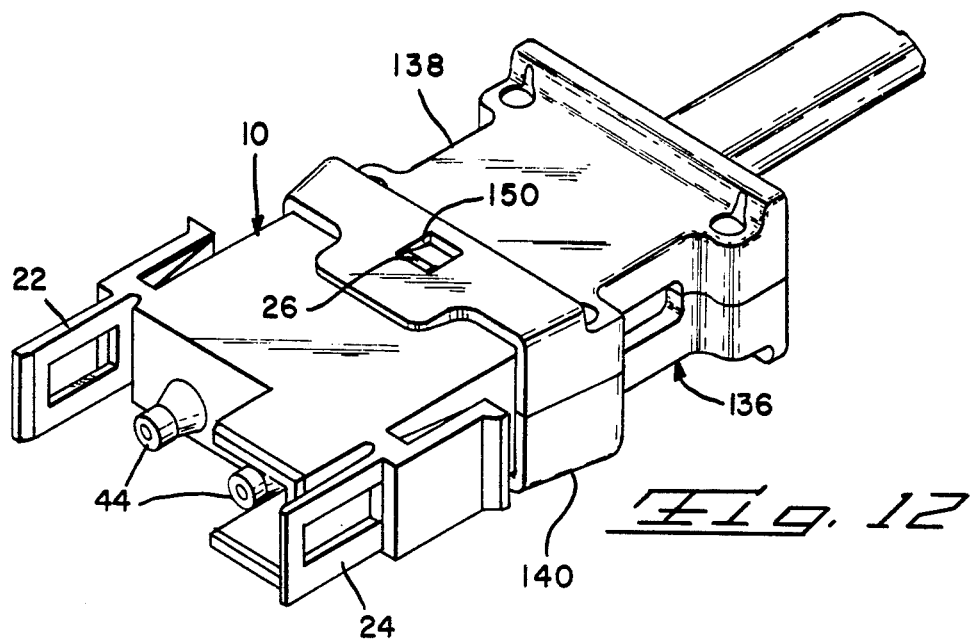
Fig. 12
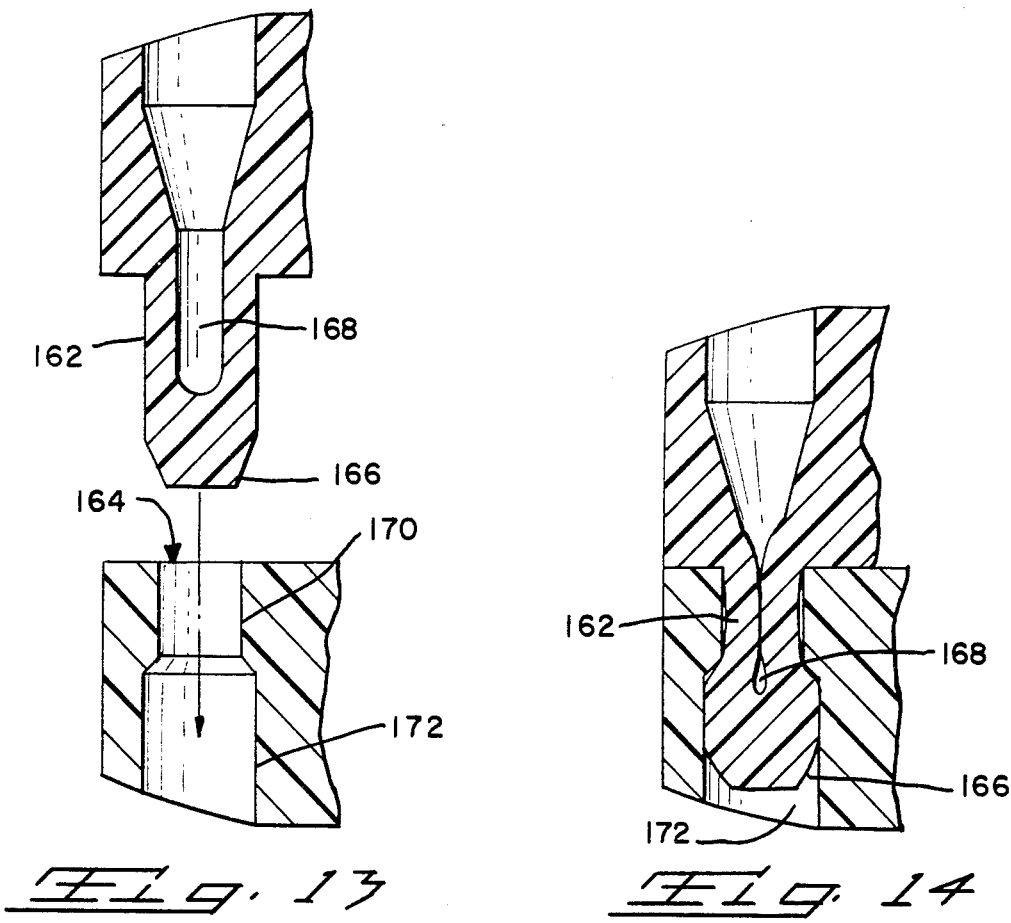
Fig. 13
Fig. 14

LIGHT TRANSMITTING FIBER CABLE CONNECTOR

BACKGROUND OF THE INVENTION

1. The Field of the Invention

The present invention relates to a connector for terminating, joining, and splicing light transmitting fiber cables having at least one optical fiber therein, and in particular, to an accurately formed connector and its method of manufacture.

2. The Prior Art

The best prior art available is represented by my U.S. Pat. No. 3,999,837. The present invention represents an improvement over the connector described therein in that it provides improved accuracy in the alignment of the fibers within the connector and ease of assembly of the connector to the individual terminated cables.

SUMMARY OF THE INVENTION

The subject light transmitting fiber cable connector includes a profiled ferrule member which initially has a blind bore. The ferrule member is clamped in a bushing which radially compresses the ferrule member. The bore is completed by conventional or laser drilling means which are accurately positioned with respect to the bushing thereby assuring proper alignment of the bore within the ferrule member. The ferrule member and bushing can be rotated about the axis of the bore during drilling to achieve even greater accuracy of positioning. The bored ferrule member is released from the bushing allowing the bore to expand sufficiently for the free passage therethrough of the fiber or fibers of a cable.

The ferrule is assembled on an end of an optical cable in the manner described in U.S. Pat. No. 3,999,837. A plurality of the thus terminated cables are mounted in a connector housing with a helical spring mounted on each cable and abutting a flange portion of the ferrule member. A cap member is assembled on the housing in a manner to compress each spring whereby the ferrule members have a floating or movable mounting within the housing. The housing further includes polarizing and/or keying means, latching means and may be provided with cable strain relief means.

It is therefore an object of the present invention to produce an improved connector for interconnecting a plurality of fiber optic cables, each including at least one optical fiber, with a high degree of accuracy of alignment between the fibers of the mated cables.

It is also an object of the present invention to produce an improved connector for fiber optic cables which will provide ease of assembly of the connector with the respective cables.

It is another object of the present invention to teach a method of producing the ferrule member for an optical fiber cable connector so that a fiber receiving bore is accurately positioned within the ferrule member and will be correctly aligned when the ferrule member is mounted in a bushing.

It is also an object of the present invention to teach a method for completing a blind bore in a ferrule member by conventional and/or laser drilling techniques with the bore accurately positioned with respect to a bushing having the ferrule member mounted therein.

It is a further object of the present invention to teach a method for completing a blind bore in a ferrule member by mounting the ferrule member in a bushing and rotating the assembly thereof about their common axis as the bore is drilled by conventional or laser drilling means.

It is further object of the present invention to produce an improved fiber optic cable connector which can be readily and economically produced.

The means for accomplishing the foregoing objects and other advantages of the present invention will be apparent to those skilled in the art from the following description taken with reference to the accompanying drawings.

BRIEF DESCRIPTION OF THE DRAWINGS

FIG. 1 is an exploded perspective view of the subject optical fiber cable connector;

FIG. 2 is a perspective view of the assembled subject connector aligned for mating with light transducer means;

FIG. 3 is a partially exploded perspective view of the subject connector aligned for mating a fiber optic cable with a bulkhead mounted component;

FIG. 4 is a perspective view, partially in section, of an alternate mounting of the subject connector of FIG. 3 on a board or surface;

FIG. 5 is a side elevation, partially in section, of the assembled connector of FIG. 2;

FIG. 6 is a side elevation, partially in section, of the assembled connector of FIG. 3;

FIG. 7 is a longitudinal section through the ferrule member according to the present invention prior to being through bored;

FIG. 8 is a longitudinal section through the ferrule member mounted in a bushing for the boring operation;

FIG. 9 is a longitudinal section through the ferrule member after boring but before release from the bushing;

FIG. 10 is a longitudinal section through the subject ferrule member after boring and release from the bushing;

FIG. 12 is a view, similar to FIG. 11, showing the alternate cover and cable strain relief means assembled on the subject connector;

FIG. 13 is a detailed section view of the latching portion of the alternate cover and cable strain relief means in a disassembled condition; and FIG. 14 is a view, similar to FIG. 13, showing the latching portion in the assembled condition.

DETAILED DESCRIPTION OF THE PREFERRED EMBODIMENT

Figure 11:
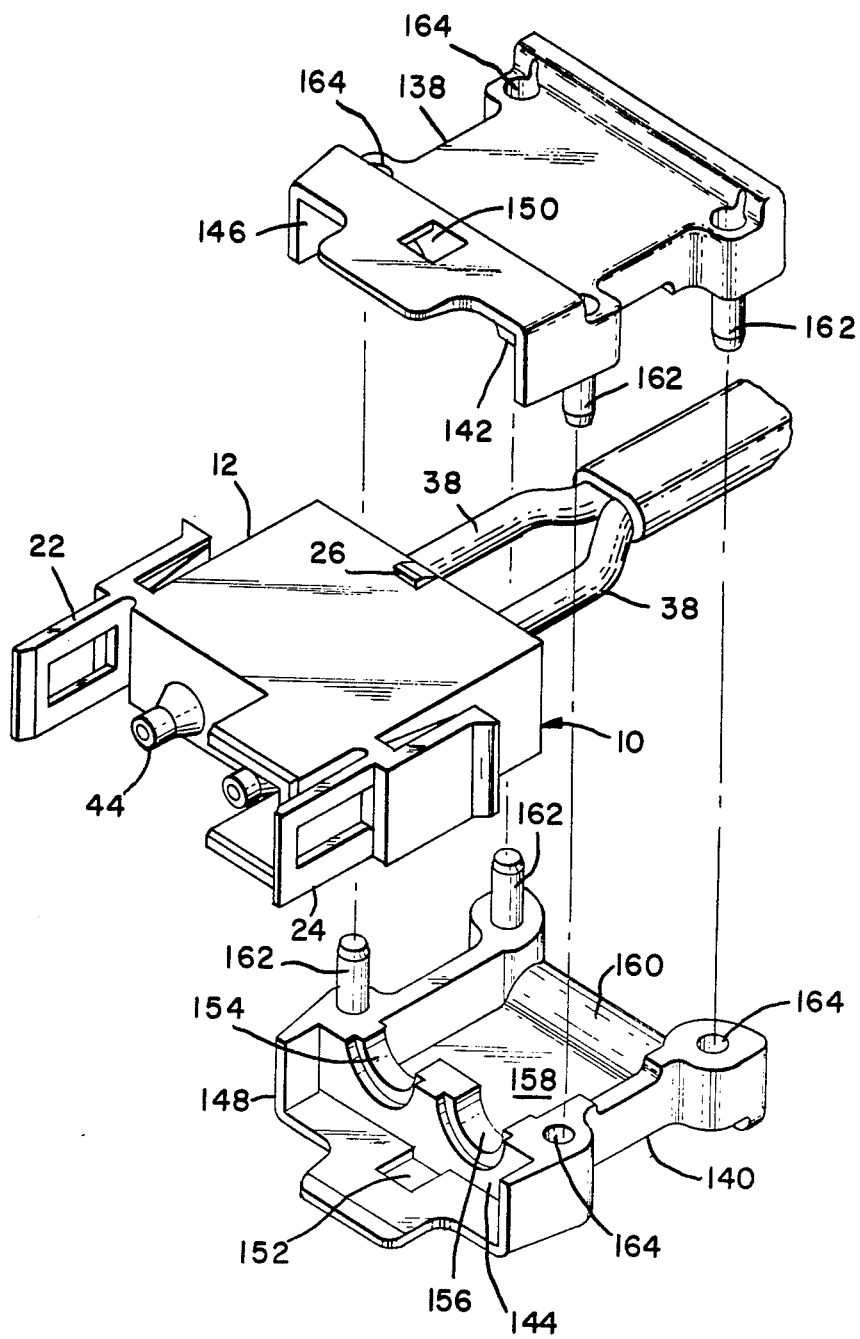
FIG. 11 is an exploded perspective view of an alternate cover including cable strain relief means to be used with the subject connector.

The subject fiber optic cable connector 10 includes a housing 12 having a profiled mating face 14 with keying and/or polarizing projections 16, 18, a plurality of profiled through bores 20, latching means 22, 24 on opposing ends or sides of the housing, and upper and lower detents 26, 28, respectively, adjacent the rear of the housing. The housing further includes a rear cap or cover member 30 which is profiled to be received over the rear of the housing 12. The cover member 30 includes upper and lower latching means 32, 34 for making with detents 26, 28, respectively, and a like plurality of recesses 36, each of which is aligned with a respective bore 20 and allow assembly of the cover member around cables 38.

Each cable 38 is terminated in the manner described in U.S. Pat. No. 3,999,837, which description is incorporated herein by reference. The stripped end of the cable (not shown) is inserted through helical spring 40 into the profiled aperture 42 of the ferrule member 44 and secured therein by crimping ring 46. The profiled ferrule member 44 and clamping ring 46 are substantially the same as described in the above-mentioned U.S. Pat. No. 3,999,837, the differences being in manufacture discussed below. The manner in which the cable 38 is stripped and the ferrule member 44 secured thereon is fully described in said patent.

The subject connector 10 is shown in FIGS. 2 and 5 mating with a fixed detector or transmitter assembly 48 secured to the edge of a printed circuit board 50 or the like. The section view of FIG. 5 also shows the profiles of the through bores 20 in the housing 10 which allow for float of the individual cables and ferrule members for appropriate mating with accurate alignment. Each bore 20 has a cylindrical rear portion 52 and a profiled forward end defined by a narrowed annular protrusion 54. The detector or transmitter assembly housing 56 has a mating face 58 with a plurality of apertures 60 therein. Each aperture 60 has a frusto-conical entry at face 58 and leads to a chamber 62 having therein either an optical transmitter or receiver 64. The detector or receiver 64 is appropriately connected by leads 66 to the circuitry 68 of printed circuit board 50. The housing 56 is secured to the board 50 by any known means, such as the bolt 70 shown.

The subject connector can also be used for panel mounting, as shown in FIGS. 3 and 6. In this instance the panel mounted connector member 72 is matable with the connector member 10 and has a housing 74 with a mating face 76 having a keying and/or polarizing recess 78 aligned to receive the respective keying and/or polarizing projections 16, 18 of connector 10. A plurality of profiled bores 80 are each aligned with a respective bore 20 of the connector member 10. The housing 74 also includes lateral projections 82 and depending rigid legs 84 which abut a front surface of a panel 86, having an aperture 88, therein for the passage of the connector member 72. Upper and lower detents 90, 92 are adjacent the rear of the housing 74. The rear cap 94 of the panel mounted connector member 72 includes at least a pair of resilient biasing arms 96, 98 which engage the rear surface of the panel 86 to securely hold the connector therein. The rear cap 94 also includes cable recesses 100 and latching arms 102 for engaging detents 90, 92 on housing 74.

FIG. 4 shows an alternate mounting of the connector member 72 with the free ends 104 of the legs 84 being at least partially deformed by known means, such as a heating tool (not shown), to secure the connector member to a rigid board 106 in a flush mounting condition. The connector member 10 can readily mate with connector member 72 when so mounted.

FIGS. 7 to 10 are longitudinal vertical sections through the ferrule member 44 according to the present invention showing the steps involved in accurately drilling the fiber receiving bore therethrough. The ferrule member 44 is initially molded with a profiled blind bore 108 extending inwardly from the rear of the ferrule member and including stepped cylindrical portions 110 and 112 joined by a conical neck 114 and a forward neck 116. The purpose of the necks 114 and 116 is to gather the fibers of a cable without breakage, as explained in the noted patent. The front exterior of the ferrule member is profiled as defined by a cylindrical nose 118 and a conical face 120 forming a step or shoulder 122. The profiled front end portion of the ferrule member 44 is placed in a profiled bore 124 of a bushing 126 and compressed radially inwardly by at least two annular bands 128, 130 to be accurately positioned within the bushing. The ferrule member 44 is secured in the bushing by cap 132 which is threaded onto the bushing. A small bore 134 is drilled in the thus compressed ferrule by either conventional drilling means or a laser beam (neither of which is shown). Upon release of the ferrule member from the bushing, FIG. 10, the bore 134 will expand and allow the free passage of a light conducting fiber or bundle of such fibers therethrough. The fibers are inserted in the ferrule member and secured therein in a manner similar to that as described with reference to FIGS. 5 to 9 of U.S. Pat. No. 3,999,837.

The above described method assures accuracy of positioning of the final bore in that the molded ferrule member is fixedly secured in a bushing which can be accurately positioned with respect to the drilling mechanism. The ferrule member is compressed into the bushing so that any irregularities in the external surface of the ferrule member will be of no consequence. Despite any surface irregularity, the ferrule member will be fixed into a known position.

Even greater accuracy of drilling can be achieved by rotating the bushing and ferrule member about the axis of the bore as the drilling takes place. This rotation will compensate for any wobble in the drilling. Of course, if the bushing and ferrule member are rotated, then the drill must have a corresponding reduction in size to compensate for the greater amount of material that will be removed.

An alternative to the rear cap or cover member 30 is shown in FIGS. 11 and 12 and includes a cable strain relief portion. The alternate cover and cable strain relief means 136 is formed by a pair of hermaphroditic members 138, 140. Each member includes a profiled front face 142, 144 adapted to mate with the housing 12 and a peripherial flange 146, 148 having an aperture 150, 152 therein for latchingly engaging the detents 26 on housing 12. The members each have at least one arcuate recess 154, 156 in the respective mating faces and together define therebetween at least one cable passage 158 intersected by a rigid transverse projection 160. The members are provided on one side with latching projections 162 and the opposite side with latching apertures 164.

FIGS. 13 and 14 show the details of the projections 162 and apertures 164. The projections 162 have a profiled free end 166 and a blind bore 168 therein. The apertures 164 have a profiled narrow entry neck 170 and an enlarged cylindrical bore 172.

It can be seen from a comparison of the projection 162 in FIGS. 13 and 14 that the blind bore 168 allows the projection 162 to be deflected inwardly by the narrow entry neck 170 to be lockingly engaged thereby.

The present invention may be subject to many modifications and changes without departing from the spirit or essential characteristics thereof. The present embodiment is therefore intended in all respects as being illustrative and not restrictive of the scope of the invention.

What is claimed is:

1. An improved connector assembly for joining light transmitting fiber cables to transmitter and/or receiver devices and/or like cables, each said connector assembly including:

a housing member having a plurality of profiled passageways extending therethrough from a cable receiving end to a mating face, a cap member detachably received on the cable receiving end of said housing to secure cables therein, a ferrule member secured on the end of each said cable, each said ferrule member having a profiled front end, at least one rearwardly directed radial shoulder, and a bore through which at least one fiber of said cable passes, a helical spring member mounted on each said cable to rest against said shoulder of said ferrule member, each said cable being inserted in a respective aperture of said housing and secured therein by said cap compressing said spring whereby the cables are positioned in the housing with limited axial movement, and keying means extending from said mating face of said housing member.

2. An improved connector assembly for joining light transmitting fiber cables to transmitter and/or receiver devices and/or like cables, each said connector assembly including:

a housing member having a plurality of profiled passageways extending therethrough from a cable receiving end to a mating face, a cap member detachably received on the cable receiving end of said housing to secure cables therein, a ferrule member secured on the end of each said cable, each said ferrule member having a profiled front end, at least one rearwardly directed radial shoulder, and a bore through which at least one fiber of said cable passes, a helical spring member mounted on each said cable to rest against said shoulder of said ferrule member, each said cable being inserted in a respective aperture of said housing and secured therein by said cap compressing said spring whereby the cables are positioned in the housing with limited axial movement, and said cap member includes at least one cable receiving arcuate recess whereby said cap member can be readily positioned onto said cable.

3. An improved connector assembly for joining light transmitting fiber cables to transmitter and/or receiver devices and/or like cables, each said connector assembly including:

a housing member having a plurality of profiled passageways extending therethrough from a cable receiving end to a mating face, a cap member detachably received on the cable receiving end of said housing to secure cables therein, a ferrule member secured on the end of each said cable, each said ferrule member having a profiled front end, at least one rearwardly directed radial shoulder, and a bore through which at least one fiber of said cable passes, a helical spring member mounted on each said cable to rest against said shoulder of said ferrule member, each said cable being inserted in a respective aperture of said housing and secured therein by said cap compressing said spring whereby the cables are positioned in the housing with limited axial movement, and said cap member comprises a pair of hermaphroditic members together forming a cable passage, each said member having a cable strain relief member extending transversely of said passage, first latching means to secure said members together, and second latching means to secure said cap member on said housing member.

4. An improved connector assembly for joining light transmitting fiber cables to transmitter and/or receiver devices and/or like cables, each said connector assembly including:

a housing member having a plurality of profiled passageways extending therethrough from a cable receiving end to a mating face, a cap member detachably received on the cable receiving end of said housing to secure cables therein, a ferrule member secured on the end of each said cable, each said ferrule member having a profiled front end, at least one rearwardly directed radial shoulder, and a bore through which at least one fiber of said cable passes, a helical spring member mounted on each said cable to rest against said shoulder of said ferrule member, each said cable being inserted in a respective aperture of said housing and secured therein by said cap compressing said spring whereby the cables are positioned in the housing with limited axial movement, and means to mount said connector on a rigid board including at least one rigid leg member depending from said housing member and adapted to be received in a corresponding aperture in said bore.

5. A connector assembly according to claim 4 wherein the free end of each said leg member is deformable to secure said connector assembly to said board.

6. A connector for fiber optic cable comprising:

a housing of one piece construction having a front mating face and a rear mating face, one or more profiled bores extending from said front face to said rear face and adapted to receive a corresponding fiber of said optic cable therethrough, each bore having a reduced section of fixed diameter within said housing and adjacent said front face, a radially compressible ferrule having a tubular portion received over each optic fiber of said cable, each ferrule additionally having a frustoconical section integral with said tubular portion and a reduced diameter end portion forwardly of and integral with said frustoconical section, each said frustoconical section being freely received along the interior of a corresponding said bore and seated against a corresponding reduced diameter portion of said bore with a corresponding said reduced diameter end portion of said ferrule projecting outwardly of said front face, a sleeve form ring encircling each said corresponding ferrule tubular portion and being radially inwardly crimped concentrically over each said tubular portion and a corresponding said optic fiber, a coil spring received over said ferrule tubular portion, a rigid cap received over said ferrule tubular portion and latched to said rear mating face, said coil spring being contained internally of said housing by said cap and compressed between said cap and said rigid ring to resiliently bias said frustoconical section against said reduced diameter portion of said bore, said ferrule being moveable rearwardly along said bore in opposition to said spring, and means adjacent said front mating face for connecting said front mating face to another connector.

7. The structure as recited in claim 6, wherein, said housing includes first projections extending transverse to the axis of said bore, said cap includes projecting arms extending transverse to the axis of said bore, and said arms and said first projections cooperating to engage opposite sides of a panel.

8. The structure as recited in claim 6, wherein, said cap includes one or more slotted openings communicating with one side thereof, each cap receiving therein a corresponding ferrule tubular portion, each said coil spring being larger in diameter than the width of a corresponding said slotted opening, and each coil spring engaging portions of said cap on opposite sides of said opening.

9. The structure as recited in claim 6, wherein, said cap is comprised of two hermaphrodically mating sections, each section having a front face provided with an arcuate recess cooperating with a like recess of the other mating section of define a cable receiving passageway, each section further having a rigid projection transversely of said cable receiving passageway, each section having depending latching projections along one side thereof and blind bores along another side thereof for latchably receiving like latching projections of the other mating section, and means on each said mating section for securing the same to the rear mating face of said housing.

* * * * *